UNITED STATES PATENT OFFICE.

PAUL FOSTER LEACH, OF WOLLASTON, MASSACHUSETTS, ASSIGNOR TO MOORE FILTER COMPANY, OF NEW YORK, N. Y., A CORPORATION OF MAINE.

METHOD OF CLEANING FILTER-LEAVES.

1,101,639.      Specification of Letters Patent.      Patented June 30, 1914.

No Drawing.      Application filed October 25, 1911. Serial No. 656,776.

*To all whom it may concern:*

Be it known that I, PAUL FOSTER LEACH, a citizen of the United States, residing at Wollaston, in the county of Norfolk and State of Massachusetts, have invented certain new and useful Improvements in Methods for Cleaning Filter-Leaves, of which the following is a specification.

My invention relates to a method for cleaning filter leaves used for filtering solutions in ore-treating processes, and particularly in the treatment of ores containing precious metals by the cyaniding process.

It is well known that in the process of treating ores containing precious metals by the cyaniding process, lime is used in order to prevent the destruction of the cyanid by the acids in the solution and in the process of filtering the solution the lime cakes or crystallizes upon the filter leaves and in the interstices of the fabric forming the same so as to interfere with the free passage of the liquids through the fabric.

The object of the present invention is to provide a method by which the lime adhering to the filter leaves may be quickly and thoroughly removed without in any way injuring the filter leaves or altering their formation so as to interfere with the subsequent proper filtration of solutions.

In practising my invention I employ lactic acid which may be either in its commercial form or diluted with water, applying the lactic acid, or its solution, directly to the fabric of the filter leaves so as to come into direct and intimate contact with the lime which may adhere thereto. The acid upon coming into contact with the lime completely dissolves the same from the surface of the fabric and from the interstices of the latter so that the lime in solution is thoroughly removed from the fabric.

In treating the leaves, according to my invention, I preferably employ a tank either of wood or wood-lined, so as not to be affected by the acid, and into which the acid is placed, preferably in a solution in the proportion of approximately one pound of commercial lactic acid, which is of twenty-two per cent. strength, to twenty-five pounds of water, and in this solution immerse the leaves until the lime carried thereby passes into solution. The action of the lactic acid upon the lime may be accelerated and the time of treatment shortened by heating the solution in any suitable manner. I have found that the process will be quickly and thoroughly performed if the solution is heated up to approximately one hundred and fifty degrees Fahrenheit, more or less. The time of treatment necessary to cleanse the leaves of the lime is, of course, dependent largely upon the strength of the solution and the temperature at which it is used, but a solution of the proportions of lactic acid and water described will thoroughly cleanse the leaves in less than an hour and, when heated to the temperature set forth, will perform the cleansing operation in less than one-half hour.

From actual performance of the method above described I find that the lactic acid in no way destroys, injures or renders brittle the fabric or the fibers of which it is composed and, in fact, acts as a preservative of the same, maintaining the fiber at all times soft and flexible. The lactic acid also has no astringent effect on the fibers tending to shrink the same and thereby enlarge the interstices of the fabric and thereby destroy its properties as a filtering medium. In other words, as far as I have been able to judge from actual tests, the use of the lactic acid has no objectionable or deleterious effect on the fabric whatever.

It will be understood that I do not desire to be limited to the exact method of treatment set forth either as to proportions, temperature, or time of treatment, as these all may vary, within the scope of my invention, according to the different circumstances under which the method is to be practised.

What I claim and desire to secure by Letters Patent of the United States is:—

1. The method of removing lime from a filter fabric which consists in subjecting the fabric to lactic acid.

2. The method of removing lime from a filter fabric which consists in subjecting the fabric to a solution of lactic acid and water.

3. The method of removing lime from a filter fabric which consists in subjecting the fabric to a solution of lactic acid and water in the proportion of approximately one pound of lactic acid to twenty-five pounds of water.

4. The method of removing lime from a filter fabric which consists in subjecting the filter fabric to the action of lactic acid in the presence of heat.

5. The method of removing lime from a filter fabric which consists in subjecting the filter fabric to the action of lactic acid in the presence of heat up to approximately one hundred and fifty degrees Fahrenheit.

6. The method of removing lime from a filter fabric which consists in subjecting the fabric to a solution of lactic acid in the proportion of one pound of twenty-two per cent. lactic acid to twenty-five pounds of water heated up to approximately one hundred and fifty degrees Fahrenheit.

In testimony whereof I have hereunto signed my name in the presence of two subscribing witnesses.

PAUL FOSTER LEACH.

Witnesses:
  M. E. McNinch,
  C. G. Heylman.